United States Patent
Rondeau et al.

[11] Patent Number: 5,796,728
[45] Date of Patent: Aug. 18, 1998

[54] COMMUNICATION SYSTEM AND METHOD FOR MODIFYING A REMOTE RADIO USING AN INTERNET ADDRESS

[75] Inventors: Michael N. Rondeau; Timothy J. Doiron, both of Forest; William J. Roderique, Lynchburg; Philip M. Hoge, Forest, all of Va.

[73] Assignee: Ericsson Inc., Research Triangle Park, N.C.

[21] Appl. No.: 670,816

[22] Filed: Jun. 25, 1996

[51] Int. Cl.⁶ .................................. H04L 12/46
[52] U.S. Cl. .................. 370/338; 370/401; 455/557
[58] Field of Search .................. 370/401, 338, 370/389, 402, 403, 475; 455/418, 419, 420, 556, 557; 340/825.44, 825.45, 825.27

[56] References Cited

U.S. PATENT DOCUMENTS

| | | | |
|---|---|---|---|
| 4,817,190 | 3/1989 | Comroe et al. | 455/11 |
| 4,905,234 | 2/1990 | Childress et al. | 370/349 |
| 4,910,510 | 3/1990 | Davis et al. | 340/825.44 |
| 4,916,539 | 4/1990 | Galumbeck | 358/142 |
| 4,975,693 | 12/1990 | Davis et al. | 340/825.44 |
| 5,025,252 | 6/1991 | DeLuca et al. | 340/825.44 |
| 5,109,403 | 4/1992 | Sutphin | 379/59 |
| 5,159,592 | 10/1992 | Perkins | 370/401 |
| 5,257,405 | 10/1993 | Reitberger | 455/54.1 |
| 5,285,469 | 2/1994 | Vanderpool | 375/1 |
| 5,297,192 | 3/1994 | Gerszberg | 455/551 |
| 5,327,486 | 7/1994 | Wolff et al. | 379/96 |
| 5,440,547 | 8/1995 | Easki et al. | 370/60 |

FOREIGN PATENT DOCUMENTS

| | | |
|---|---|---|
| 0 529 721 A1 | 8/1992 | European Pat. Off. |
| 0 690 640 A2 | 1/1996 | European Pat. Off. |
| 44 08 794 A1 | 3/1994 | Germany. |
| 2 2873 645 | 5/1995 | United Kingdom. |
| WO 95/27942 | 10/1995 | WIPO. |
| WO 95/28808 | 10/1995 | WIPO. |
| WO 95/24791 | 9/1997 | WIPO. |

OTHER PUBLICATIONS

Andrew S. Tanenbaum, *Computer Networks*, 2nd Ed., Prentice-Hall Int'l, 1993, Ch. 7.2, pp. 454–456.

Douglas E. Comer et al, *Internetworking with TCP/IP*, vol. II, Prentice-Hall Int'l, 1992, Ch. 20, pp. 429–447.

*Primary Examiner*—Chau Nguyen
*Attorney, Agent, or Firm*—Jenkens & Gilchrist

[57] ABSTRACT

A radio communication system having a host computer and at least one remote, mobile, two-way radio communicating with the host computer by exchanging data packets. A communication gateway between the host computer and the remote radios mediates the exchange and maintains an address table containing both the physical address and an internet address for the various components. The gateway translates between the physical and internet addresses, allowing more flexible communication between the various interconnected components.

16 Claims, 3 Drawing Sheets

COMMUNICATION SYSTEM AND METHOD FOR MODIFYING A REMOTE RADIO USING AN INTERNET ADDRESS

FIELD OF THE INVENTION

The present invention relates generally to radio frequency (RF) communication systems, such as a two-way multi-user radio system, particularly to a communication system and method for generating signals to read or modify various features of a remote radio unit, and more particularly to a communication system and method for remotely modifying a remote radio unit using an internet communication protocol.

BACKGROUND AND OBJECTS OF THE INVENTION

In conventional land mobile radio (LMR) systems, multiple radio transceivers, including for example portable radio units and mobile radio units, initiate and carry on communications over a preselected radio frequency channel, typically via a base station repeater. Land mobile radios are particularly used by police and fire departments, rescue workers, paramedics, power and telephone company field technicians, municipalities, and other mobile groups that require immediate communication with other members of their respective group. Communication between the various members can include visual information, which may be displayed on a mobile data terminal (MDT). For example, a police officer on patrol can request and receive information from a base or host computer about a stopped motorist, which is displayed on an MDT in the patrol car.

MDTs and other such display devices are connected to mobile transceivers, which not only transmit requests to the host computer but also receive information and instructions therefrom. Each of these mobile transceivers or radios includes a non-volatile memory device, such as an EEPROM (electrically erasable programmable read only memory), which stores program instructions for the radio. The EEPROM also includes so-called "personality" parameters that define the operation of the radio. These personality parameters may include operating frequencies, group and individual identification numbers, tone frequencies, and other operational parameters. Additionally, personality may include customer options for various commercial features, some or all of which are available to customers according to price, region or availability, and other features, such as data encryption, and digital voice and data.

Although the personality parameters of a given radio are stored in EEPROM and other memory within the radio, heretofore modification of these parameters has required physical removal of the radio and attachment to a computer, such as a laptop, to access and change the aforesaid parameters stored therein. Accordingly, in conventional radio apparatus exhibiting personality, modifications of those parameters are both time- and labor-intensive.

It is therefore an object of the present invention to provide a communication system and method for remotely modifying the internal personality or operational parameters of mobile or portable transceivers without the need for physical removal, particularly, without the need for any physical adjustment of or addition to the mobile transceiver to accomplish such modification, and more particularly, while the mobile transceiver remains in use.

It is another object of the present invention to provide a communication system and method to remotely modify radio operational parameters through the use of an internet communication protocol, and, more particularly, through the use of internet addresses.

It is a further object of the present invention to provide a communication system and method to mediate data exchanges using internet addresses.

Accordingly, these and other objects are achieved in the present invention providing an improved and more flexible communication system and method.

SUMMARY OF THE INVENTION

A radio communication system having a host computer communicates with at least one remote, mobile, two-way radio through the exchange of data packets. A communication gateway between the host computer and the remote radios mediates the exchange and maintains an address table containing both the physical address and an internet address for the various components. The gateway translates between the physical and internet addresses, allowing more flexible communication between the various interconnected components.

BRIEF DESCRIPTION OF THE DRAWINGS

These and other features and advantages of the present invention will be better and more completely understood with reference to the following detailed description of a presently preferred embodiment in connection with the drawings, of which.

DETAILED DESCRIPTION OF THE PREFERRED EMBODIMENT

Before describing the over-the-air radio programming communications system and method provided by the presently preferred embodiment of the present invention, it is useful to first briefly describe the overall radio system environment in which the present invention is used. The present invention is particularly useful in the context of land mobile radio (LMR) systems such as used by police or other such mobile groups, an example of which is shown in FIG. 1.

Figure 1:
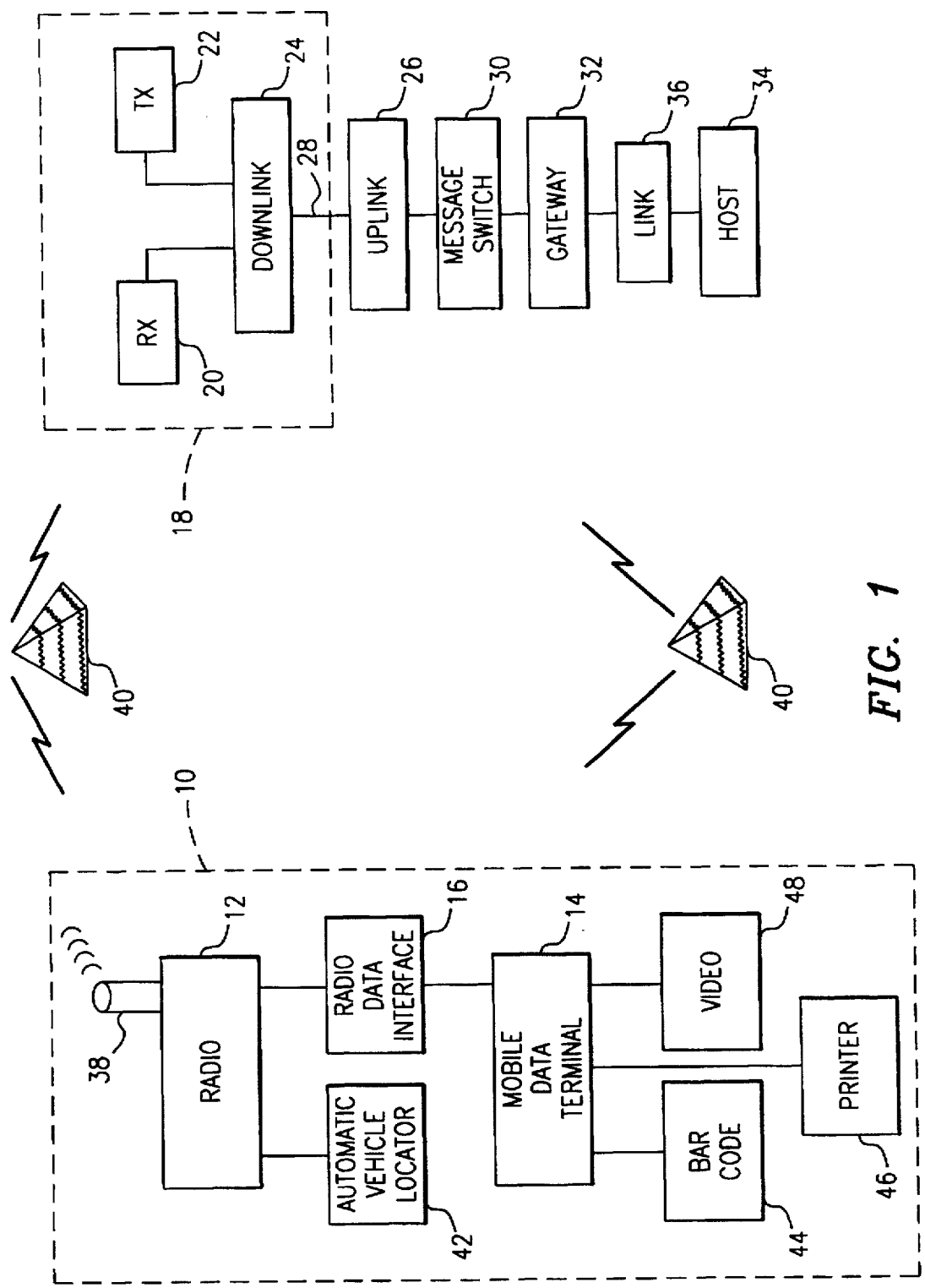
FIG. 1 illustrates a functional block diagram of a radio communication system provided by the present invention.

As shown in FIG. 1, remote system 10 includes a digital radio transceiver 12 and a mobile data terminal (MDT) 14 linked together via a radio data interface (RDI) 16, a protocol converter which translates digital data to radio signals and vice versa. A base system 18 includes a digital radio transceiver, shown here as two separate components, a digital radio receiver 20 and a digital radio transmitter 22, both of which are connected to a downlink device 24. The base system 18 is connected to an uplink device 26 via a phone line 28 or other linkage means. Also shown in FIG. 1 is a message switch 30 used to route information to a gateway 32 or other devices such as a dispatch console (not shown). Gateway 32 is in turn connected to a host computer 34 over a communication link 36 using Internet protocol, such as User Datagram Protocol (UDP), Transmission Control Protocol (TCP) or some proprietary protocol, whereby digital signals initiated at the remote MDT 14 or the radio 12 are ultimately received by the host computer 34 for processing.

In operation, a police officer or other mobile person accesses the MDT 14 in their remote system 10, located for example, in the police car. Requests for information, such as traffic records, are made and forwarded across the serial RDI 16 link to the radio transceiver 12, which transmits the radio signals via antenna 38 in accordance with a particular data communications protocol to the base system 18 via one or more radio towers 40. The radio signals, received by radio receiver 20, are forwarded to the message switch 30 via the downlink 24 and the uplink 26. The radio signals from the receiver 20 to the downlink 24 and the digital signals from the downlink 24 to the transmitter 22 are converted to digital data and radio signals, respectively, by RDI devices (not shown). From switch 30, the digital data is forwarded to the gateway 32 and then on to the host computer 34 across communication link 36 for processing.

As mentioned, the digital data exchanged between the remote system 10 and the base system 18, both of which could constitute a respective multiplicity of such systems, is transmitted and received according to a particular data communications protocol, such as the International Standards Organization-Open System Interconnect (ISO-OSI), a well-known seven-layer protocol. The data communications protocol utilized in the present invention, referred to as ProFile, is also a seven-layer protocol substantially adhering to the spirit of the ISO-OSI model.

The digital data forwarded between the remote system 10 and base system 18 is transmitted in data packets, the data structures of which may vary depending upon the type of transfer. However, the overall format of the data structures used in the present invention are generally described in U.S. Pat. No. 4,905,234. In general, the digital data bursts described therein include three portions: (a) a header portion, (b) a data packet collection portion, and (c) an end of message portion. The details of the data structure formats used by the preferred embodiment of the present invention are generally understood and will not be discussed herein. It should be understood, however, that in the presently preferred embodiment of the invention, the data packet collection portion may contain a command field encapsulated therein. In particular, the collection portion may contain internet addressing information.

The communication system and method of the present invention are designed to operate in both a conventional rf-data environment and a land-line environment. The rf-data environment is one generally restricted to a single base system or site 18 and, therefore, covers a relatively small geographic area. The land-line environment, on the other hand, connects a plurality of sites 18 together, allowing a remote system 10 to roam between the sites.

With the increasing use of the Internet and other networks for communication and data transference, the present invention is also intended to take advantage of this new technology by using a standard internet protocol (IP) to mediate the data exchanges. Preferably, the gateway 32 of the present invention is bi-directional, supports both rf-data and land-line environments and employs internet protocol to control the routing of data packets. Host computer 34 may be connected to the gateway 32 across a short physical link 36 or across an internet link 36 hundreds or thousands of miles away. For example, the host computer 34 can direct a data packet to a remote MDT 14 through use of an internet address such as 147.117.45.123. More particularly, gateway 32 translates the above internet address to the MDT's 14 physical address or logical identification number (LID), e.g., 1024, and forwards the data packet incorporating this and other information. Upon receipt, the transceiver 12 forwards the data packet on to the MDT 14.

It should be understood that by use of internet addressing the host computer 34 can also send a data packet directly to the remote radio 12 itself by assigning it a different internet address, e., 147.117.45.124, than that used by the attached MDT 14. More particularly, gateway 32 translates this internet address to the radio's LID, which is also 1024 because the radio 12 can only handle one data packet at a time, and forwards the data packet incorporating the radio's LID, internet address and other information. With reference to the information in the header portion, the radio 12 determines that the data packet is destined for the radio itself instead of an attached device.

By use of the aforesaid internet communication protocol, the host computer 34 is able to send data packets to the transceiver 12 and make various modifications thereto remotely, even while the remote system 10 is moving and in use. In other words, remote over-the-air programming minimizes or avoids the need to bring the remote system 10, and hence one or more of a fleet of vehicles, to a shop to make these changes. Further, when using an internodal gateway, i.e., various nodes connected together by an ethernet link using internet protocol, the radio 12 could be reprogrammed even through a roamed node.

It should be understood that since the internet address-logical identification mapping is done within the gateway 32, the remote physical components do not have to know their internet address, particularly, the radio 12. The gateway 32 includes a host table for this translation between the different IP addresses of the remote devices and the radio's LID, and the data packets emanating from the gateway 32 include the necessary physical as well as internet routing information. Accordingly, data packets emanating from the radio 12, initially routed to the LID of the host computer 34, are received by the gateway 32 and sent to the host computer 34 via the corresponding internet address. Additional devices could be attached to either the radio 12, e.g., a GPS-based Automatic Vehicle Locator 42 (AVL), or the MDT 14, e.g., a bar code reader 44, a printer 46 and/or a video apparatus 48, all of which are assigned a different IP address and which could independently, albeit not simultaneously, send/receive data packets to/from the host computer 34.

With the configuration set forth in FIG. 1, various communications and data packet exchanges can take place, as described in more detail in FIGS. 2A–3B.

Figure 2A:
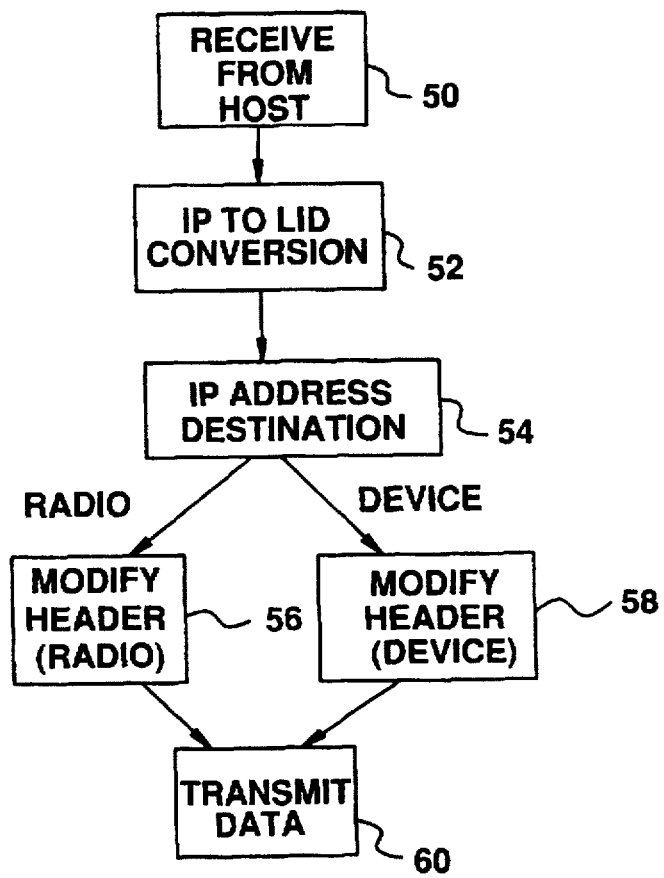
FIG. 2A is a schematic flow diagram illustrating the steps followed by a host computer and a gateway in forwarding, converting and transmitting a data packet to a remote system.

FIG. 2A is a flow chart illustrating the steps followed for a communication originating from the host computer 34 and terminating by a broadcast by the base system 18. The host computer 34 forwards a data packet, containing for example personality modifications for a given remote transceiver 12, to the gateway 32, which receives the data packet (in box 50) and converts the internet address of the radio 12 to its corresponding LID (in box 52). Since the LID for the radio 12 and the attached MDT 14 and any other peripherals attached to the radio 12 have the same LID to prevent simultaneous transmissions to the same radio, reference must instead be made to the internet address (in box 54) to distinguish between the potential destinations, which in this example is the radio 12. The data packet, e.g., the header portion, is then changed (in box 56) to further indicate that the data packet is radio-destined. Similarly, if the MDT 14 were chosen as the destination, the data packet would then be changed (in box 58) accordingly. It should be understood that if additional peripherals were placed on the radio 12 or on the MDT 14, the appropriate changes (in the appropriate boxes) could be made as well. With the changes complete, the data packet is then transmitted (in box 60).

Figure 2B:
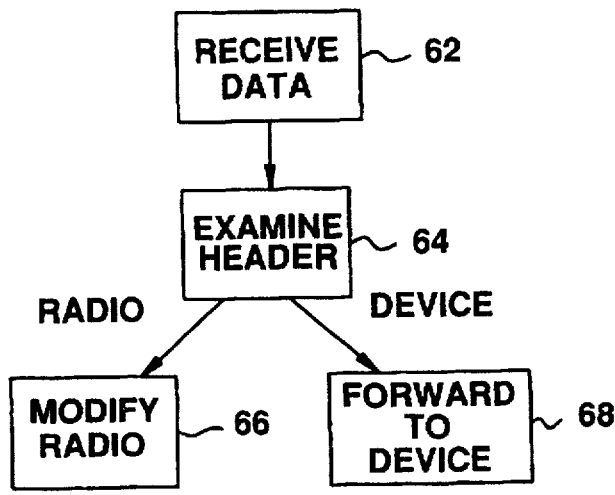
FIG. 2B is a schematic flow diagram illustrating the steps followed by the remote system in receiving and forwarding the data packet.

FIG. 2B is a flow chart illustrating the steps followed for the communication of the signal transmission in FIG. 2A to the appropriate remote device. After receipt of the transmitted data packet (in box 62) by the radio 12, the data packet's header portion is examined (in box 64) and the data packet routed accordingly. In this example, since the header portion of the data packet indicates that the destination is the radio 12, the data in the data packet collection portion is extracted and consumed (in box 66) by the radio 12 itself. If the data packet were going to the attached MDT 14, however, then the radio 12 would forward the data packet (in box 68) accordingly. It should be noted that forwarding the data packet to a peripheral is a default for the radio 12.

Figure 3A:
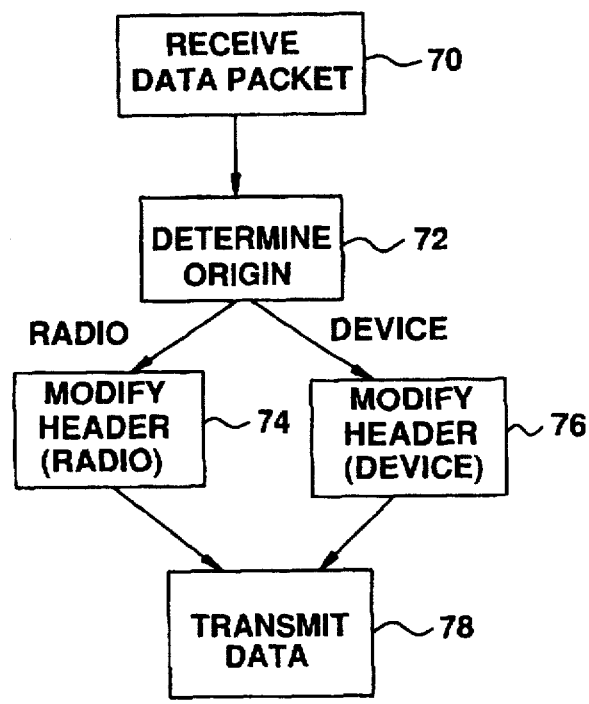
FIG. 3A is a schematic flow diagram illustrating the steps followed by a remote system in forwarding, converting and transmitting a data packet to a computer host.

FIG. 3A is a flow chart illustrating the steps followed for communications from the remote system 10 to broadcasting by the radio 12. The radio 12 generates or receives a data packet (in box 70), determines (in box 72) the origin of the data packet, and then modifies the data packet to indicate whether the data is from the radio itself (box 74) or the MDT 14 (box 76). The modified data packet is then transmitted (in box 78). It should be understood that in the presently preferred embodiment although the radio 12 does not utilize internet addresses, the devices attached to the radio 12, such as the MDT 14, may. Accordingly, the MDT 14, through prior contact with the host computer 34 or other destination devices, may incorporate the internet address of the destination device within the data packets, particularly, within the data packet collection portion. Further, since the physical address of the MDT 14 or any other device attached to the radio 12 is the same, the data packet includes additional information, i.e., a source identifier, to indicate the actual source of that data packet.

Figure 3B:
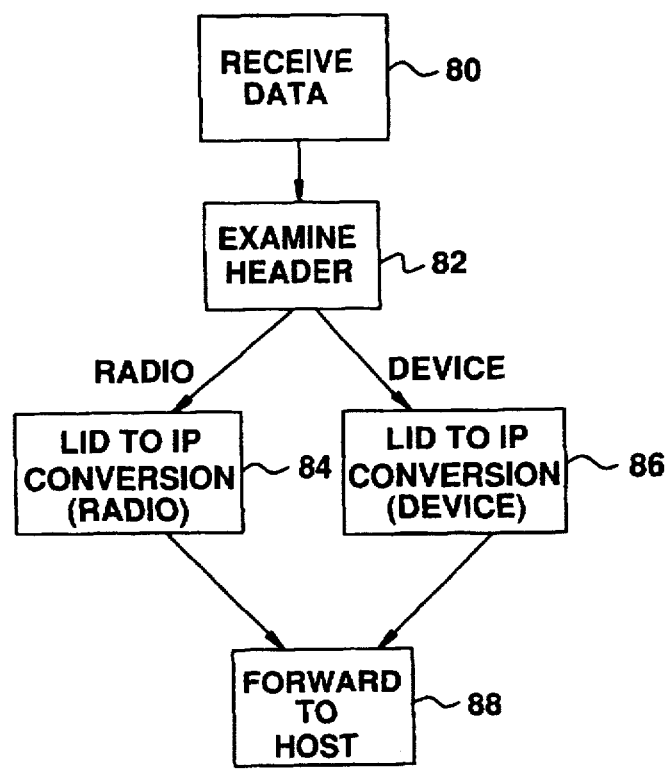
FIG. 3B is a schematic flow diagram illustrating the steps followed by a gateway in receiving, converting and forwarding the data packet to the host computer.

FIG. 3B is a flow chart illustrating the steps followed for the communication of the signal transmission in FIG. 3A to the host computer 34. After receipt of the data packet (in box 80) from the base system 18, the gateway 32 examines (in box 82) the data packet, particularly, the header portion. If the header portion of the data packet indicates that the signal origin was the radio 12, the appropriate IP address for the radio's LID is forwarded (in box 84). Similarly, if the header portion indicates that the MDT 14 is the source, then a different IP address, i.e., a unique internet address for the MDT 14 alone, is forwarded (in box 86). The data packet is then routed (in box 88) via internet communication protocol to the host computer 34, which could be physically located a considerable distance away.

Through use of the above-described communication system and method, various programmable features of remote radios, such as personality, feature encryption data and tracking data are modifiable over the air. Furthermore, since the communication is two-way, information from the remote unit, such as a particular radio's serial number stored in ROM, can be transmitted back to the host computer 34 for further processing.

The preferred data communications protocol, ProFile, used in the present invention follows a strict client/server model where the remote radio 12 is considered to be a server in a permanent listening state and the host computer 34 is a client requesting service. Personality data for a radio may include the radio's status information, i.e., radio identification as to the type of radio being accessed, the radio's LID, site information including site identifiers and frequencies, group identification, the hardware version level of the radio, the type of compression algorithm supported by the radio, available EEPROM and flash ports available, the sizes of the feature, tracking and key data currently in the radio, the versions of software, the serial number for the ROM which identifies each radio and which is used when determining new feature data for the radio, a field indicating whether the radio's encryption table was zeroed, the ROM version and the size of the radio's flash code. It should be understood that some of these parameters are fixed and others variable and thus programmable.

Similarly, tracking data for the particular radio can also be downloaded. For example, the non-linear characteristics of the electronics can be compensated for in software, e.g., making adjustments to the hardware's frequency parameters.

It should be understood that when new personality or other features are forwarded in fragmented data packets of limited size, e.g., 512 bytes, the radio re-assembles the data, and when the transfer is complete, the new personality or other features are then swapped. The new features then control. Similarly, it should also be understood that the gateway 32 also gathers together fragments of data across a plurality of data packets and re-assembles the fragments prior to forwarding the data.

While the invention has been described in connection with a preferred embodiment thereof, it is to be understood that scope of the invention is not limited to the described embodiment, but is intended to encompass various modifications and equivalents within the spirit and scope of the appended claims.

What is claimed is:

1. A communication system comprising:
   (a) a host computer;
   (b) a plurality of mobile, two-way radios in communication with said host computer; and
   (c) a communication gateway between the host computer and said plurality of radios, said gateway including an address table containing a plurality of physical addresses and corresponding Internet addresses for the host computer and the plurality of radios, said address table further containing a plurality of physical addresses and corresponding Internet addresses for a plurality of peripheral devices attached to at least one of the plurality of radios, said gateway controlling the communication between said host computer and said plurality of peripheral devices using at least one of the Internet addresses.

2. The communication system according to claim 1, wherein each of the radios has a memory therein storing a plurality of operational parameters of the respective radio, and wherein at least one of the operational parameters of the respective radio is changed in response to an instruction from the host computer.

3. The communication system according to claim 2, wherein said at least one operational parameter is changed by the host computer while the respective radio is in use.

4. The communication system according to claim 1, wherein a plurality of operational parameters for a plurality of radios are changed by the host computer.

5. The communication system according to claim 1, wherein one of said peripheral devices is a mobile data terminal attached to one of the radios.

6. The communication system according to claim 5, wherein another of the peripheral devices is a printer attached to the mobile data terminal.

7. The communication system according to claim 5, wherein another of said peripheral devices is a bar code reader attached to the mobile data terminal.

8. The communication system according to claim 5, wherein another of said peripheral devices is a video camera attached to the mobile data terminal.

9. The communication system according to claim 1, wherein another of said peripheral devices is a GPS-based automatic vehicle locator system.

10. In a two-way radio communication system including a host computer, a plurality of mobile two-way radios and a communication gateway between the host computer and the plurality of radios, the gateway having an address table containing a plurality of physical addresses and corresponding Internet addresses for the host computer, said plurality of radios and a plurality of peripheral devices attached thereto, a method for exchanging data packets between said host computer and said plurality of peripheral devices using the Internet addresses, said method comprising the steps of:

generating within the host computer a plurality of data packets, each of said data packets including the Internet address of a destination peripheral device, said destination peripheral device being attached to a given radio;

forwarding the data packets via the Internet address to the communication gateway, converting the Internet address of the destination peripheral device to the corresponding physical address using said address table, and incorporating said physical address in the data packets;

transmitting the data packets to the destination peripheral device through said given radio; and receiving, decoding and consuming the data packets at the destination peripheral device.

11. The method according to claim 10, wherein the data packets forwarded to the destination peripheral device include a plurality of operational parameter modifications to said destination peripheral device.

12. The method according to claim 10, wherein said data packets forwarded to the destination peripheral device include a request for information therefrom, said method further comprising the steps of:

generating within the destination peripheral device a response to said request; and transmitting said response back to the host computer.

13. The method according to claim 10, wherein said destination peripheral device is a mobile data terminal.

14. In a two-way radio communication system including a host computer, a plurality of mobile two-way radios and a communication gateway between the host computer and the plurality of radios, said gateway having an address table containing a plurality of physical addresses and corresponding Internet addresses for the host computer, said plurality of radios and a plurality of peripheral devices attached thereto, a method for exchanging data packets between said host computer and said plurality of peripheral devices using the Internet addresses, said method comprising the steps of:

generating within a source peripheral device a plurality of data packets, and forwarding the data packets to a respective one of the radios, said source peripheral device being attached to said respective one radio, the physical address of the host computer and the source peripheral device and a source identifier being included in the data packets;

transmitting the data packets to the gateway, and, using the source identifier, converting the physical address of the source peripheral device within the data packets to the corresponding Internet address using said address table; and forwarding said data packets to said host computer using said corresponding Internet address.

15. The method according to claim 14, wherein said source peripheral device is a mobile data terminal.

16. The method according to claim 14, wherein said data packets forwarded from said source peripheral device to said host computer include a plurality of operational parameters for said source peripheral device, and said method further comprising the steps of:

receiving and decoding said plurality of operational parameters within the host computer;

based upon the values of the operational parameters of said source peripheral device generating within said host computer a plurality of operational parameter modifications for a given destination peripheral device;

forwarding said operational perimeter modifications for said given destination peripheral device to the gateway using an Internet address corresponding to said given destination peripheral device, converting said Internet address to the corresponding physical address using said address table and transmitting the to operational parameter modification the given destination peripheral device.

* * * * *